United States Patent [19]
Klinger et al.

[11] Patent Number: 5,851,029
[45] Date of Patent: Dec. 22, 1998

[54] GAS PRESSURE RESTRAINT, SENSING AND RELEASE SYSTEMS

[75] Inventors: Barney Klinger, 28020 Avenue Stanford, Valencia, Calif. 91355-1105; Robert William Reynolds, Los Angeles, Calif.

[73] Assignee: Barney Klinger, Santa Barbara, Calif.

[21] Appl. No.: 2,621

[22] Filed: Mar. 24, 1998

Related U.S. Application Data

[62] Division of PCT/US96/00594 Jan. 19, 1996 published as WO97/26160 Jul. 24, 1997.

[51] Int. Cl.$^6$ ................................................. B60R 21/26
[52] U.S. Cl. ........................... 280/736; 222/54; 280/737; 280/739; 280/741; 280/742
[58] Field of Search .................................... 280/736, 737, 280/738, 739, 741, 742, 740; 222/54; 102/272, 530, 531

[56] References Cited

U.S. PATENT DOCUMENTS

| | | | |
|---|---|---|---|
| 3,966,228 | 6/1976 | Neuman | 280/737 |
| 4,094,935 | 6/1978 | Gruber | 200/83 |
| 4,805,930 | 2/1989 | Takada | 280/739 |
| 5,003,887 | 4/1991 | Unterforsthuber et al. | 102/531 |
| 5,078,422 | 1/1992 | Hamilton et al. | 280/736 |
| 5,217,249 | 6/1993 | Kokeguchi | 280/728 |
| 5,221,109 | 6/1993 | Marchant | 280/736 |
| 5,269,561 | 12/1993 | Davis et al. | 280/736 |
| 5,331,126 | 7/1994 | Dwyer et al. | 200/83 |
| 5,346,251 | 9/1994 | Burnard et al. | 280/737 |
| 5,346,252 | 9/1994 | Levosinski | 280/740 |
| 5,351,977 | 10/1994 | Grace | 280/738 |
| 5,366,242 | 11/1994 | Faigle et al. | 280/736 |
| 5,388,322 | 2/1995 | Simon | 29/525 |
| 5,388,860 | 2/1995 | Brede et al. | 280/739 |
| 5,415,429 | 5/1995 | Fisher | 280/741 |
| 5,433,475 | 7/1995 | Kokeguchi | 280/736 |

*Primary Examiner*—Eric D. Culbreth
*Attorney, Agent, or Firm*—Benoit Law Corporation

[57] ABSTRACT

Apparatus for discharging gas from a bottle of compressed gas include a compressed gas release having on that bottle a compressed gas outlet having a closed position and an alternative open position. A shuttle has a first position spaced from that compressed gas outlet before and after opening of such compressed gas outlet and has a second position at such compressed gas outlet. The shuttle includes a temporary compressed gas flow restriction at the compressed gas outlet in the alternative open position of such compressed gas outlet. A system for discharging gas from a bottle of compressed gas closes such bottle with a burst diaphragm, subsequently penetrates such burst diaphragm, momentarily reduces flow of compressed gas from the bottle at the penetrated burst diaphragm, and thereafter removes the reduction of flow of compressed gas from the bottle at the penetrated burst diaphragm.

20 Claims, 6 Drawing Sheets

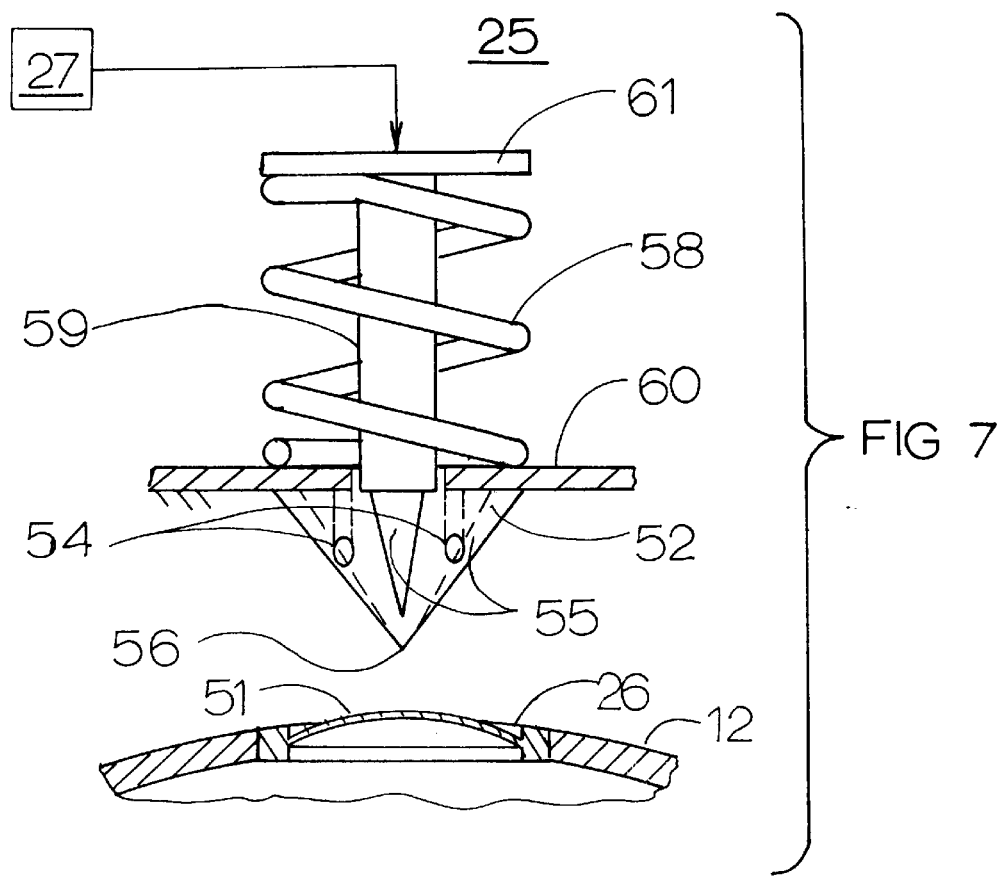
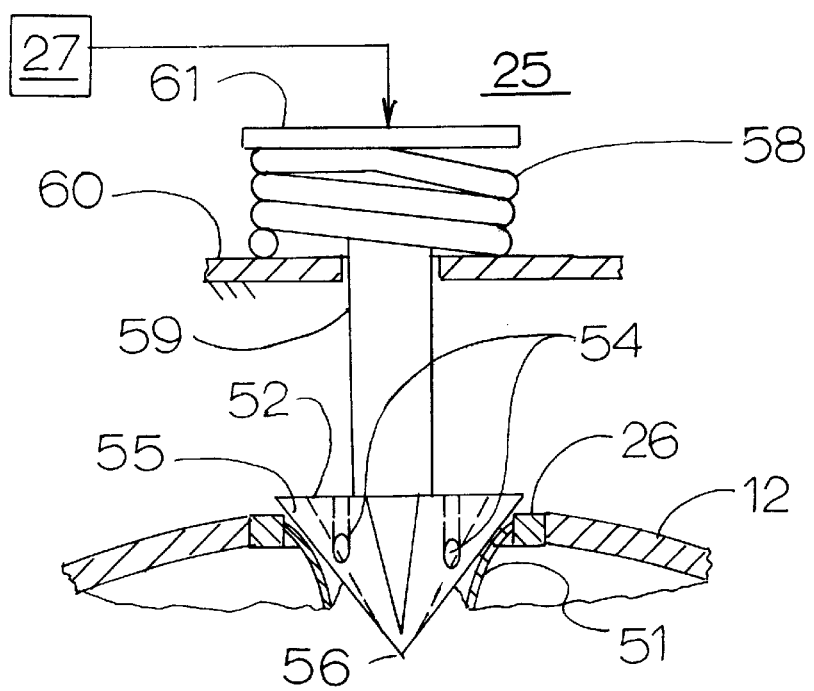

GAS PRESSURE RESTRAINT, SENSING AND RELEASE SYSTEMS

CROSS-REFERENCE

This is a division of International Application PCT/US96/00594, filed 19 Jan. 1996, supplemented with new claims on 18 Nov. 1996, and published as WO 97/26160 on 24 Jul. 1997, and herewith incorporated by reference herein.

TECHNICAL FIELD

The technical field of the invention includes vehicular supplemental restraint systems and other systems for inflating gas bags, gas pressure sensing and indicating systems, and systems for selectively releasing bottled gas.

BACKGROUND ART

By way of background, and not by way of limitation, reference may be had to vehicular supplemental restraint systems wherein occupants are protected by inflating gas bags in the case of serious collision.

In some systems, bags are inflated from a gas storage bottle. However, whenever there is insufficient gas in the bottle, such as because of long-term leakage or gas migration through the bottle wall, there is inadequate inflation of the gas bag with consequent insufficient protection to the vehicle occupant in emergencies.

In consequence, almost all so-called "air bag" systems now use gas generators which typically involve setting off explosive charges for inflating bags upon sensing a serious collision. However, variations in bag inflation, such as due to differences in volume and pressure of generated gases, is a problem. Ambient temperature variations affect both bottled gas and generated gas systems. If gas pressure is excessive, such as due to high environmental temperatures affecting bottled gas and explosive charges, occupants are thrust back so violently by the inflating bag as to cause injury. Bag tearing or bursting also occurs from overpressure or overly rapid bag inflation.

In the case of gas generation with explosive charges, some relief was sought by venting excess gas during the inflation process. However, this created a hazard of venting obnoxious gases into the vehicle interior. Worse yet, escaping hot explosive gases would burn occupants. In desperate attempts to avoid such problems, gas exhaust passages were provided through firewalls of vehicles between the engine and the driver's or passenger's compartment. This, however, is a dangerous practice, since firewalls are there to protect drivers and passengers from flames bursting out from a damaged fuel supply or engine and, therefore, should not be penetrated by gas escape conduits that are rarely and hopefully never used.

Moreover, in various fields where bottled gas is used, there is a lingering uncertainty about the actual volume of gas left in the bottle or about the tightness and other condition of the bottle and associated structure. Mere pressure sensing of the compressed gas in the bottle is inadequate in some situations, since gas volume and thereby pressure vary with temperature. In consequence, gas bottles are sometimes taken out of service or desired services are not performed, when there in fact (a) is nothing wrong with the bottle and its valving, while (b) there still is sufficient gas volume left in the bottle for its given task or, conversely, (c) operations are initiated with a bottle whose compressed gas content has in fact become inadequate for the task.

DISCLOSURE OF INVENTION

It is a general object of the invention to overcome these disadvantages.

It is a germane object of the invention to provide improved vehicular supplemental restraint systems and other systems for inflating gas bags.

It is a related object of the invention to provide for inflation of gas bags from gas bottles that do not have the drawbacks of explosive charges.

It is also an object of the invention to provide improved gas pressure sensing and indicating systems.

It is a further object of the invention to provide improved systems for selectively releasing bottled gas.

It is also an object of the invention to provide combinations of such improved systems.

Other objects of the invention will become apparent in the further course of this disclosure.

The invention resides in apparatus for discharging gas from a bottle of compressed gas, and, more specifically, resides in the improvement comprising, in combination, a compressed gas release having a compressed gas outlet on that bottle, such compressed gas outlet having a closed position and an alternative open position, and a shuttle having a first position spaced from the compressed gas outlet before and after opening of the compressed gas outlet and having a second position at the compressed gas outlet, such shuttle including a temporary compressed gas flow restriction at the compressed gas outlet in the alternative open position of such compressed gas outlet.

The invention resides also in apparatus for discharging gas from a bottle of compressed gas which comprise in combination, a compressed gas release having a compressed gas outlet on that bottle, a burst diaphragm closing that compressed gas outlet, and a burst diaphragm penetrator having a first position spaced from the compressed gas outlet before and after opening of such compressed gas outlet and having a second position at the compressed gas outlet after penetration of the burst diaphragm by such penetrator, such burst diaphragm penetrator including a temporary compressed gas flow restriction at the compressed gas outlet after penetration of the burst diaphragm by such penetrator.

According to embodiments of the invention, the compressed gas release includes a compressed gas release pulse shaper including the above mentioned shuttle.

The above mentioned burst diaphragm penetrator may include a first-to-second position propellant or a second-to-first position actuator.

According to a preferred embodiment of the invention, the defined apparatus include an extreme-gas-pressure signaling device; preferably with a temperature compensation.

The invention also resides in a method of discharging gas from a bottle of compressed gas, and, more specifically, resides in the improvement comprising, in combination, closing that bottle with a burst diaphragm, subsequently penetrating such burst diaphragm, momentarily reducing flow of compressed gas from the bottle at the penetrated burst diaphragm, and thereafter removing the reduction of flow of compressed gas from the bottle at the penetrated burst diaphragm.

Discharge of gas from the bottle of compressed gas preferably is effected in phases of compressed gas flow including the momentary reduction of flow of compressed gas from the bottle at the penetrated burst diaphragm. There may be an initial phase wherein flow of compressed gas from the bottle is restricted by the momentary reduction of flow of compressed gas from that bottle at the penetrated burst diaphragm, and a subsequent phase wherein flow of compressed gas from the bottle is unrestricted.

Flow of compressed gas from said bottle may be momentarily reduced by a gas flow restriction at the penetrated burst diaphragm.

A gas bag may be inflated with gas discharging from the bottle in embodiments of apparatus and methods of the invention. A gas inlet passage variator may be provided between the compressed gas outlet of the bottle and a gas inlet passage of the gas bag.

By way of example, such gas bag may be a vehicular gas bag inflated with gas from the bottle of compressed gas against an occupant in an emergency.

BRIEF DESCRIPTION OF DRAWINGS

The subject invention and its various aspects and objects will become more readily apparent from the following detailed description of preferred embodiments thereof, illustrated by way of example in the accompanying drawings which also constitute a written description of the invention, wherein like reference numerals designate like or equivalent parts, and in which:

FIGS. 7 to 10 are partially sectioned elevations of a gas flow pulse shaper shown at different phases of operation according to an embodiment of the subject invention.

MODES OF CARRYING OUT THE INVENTION

Figure 1:
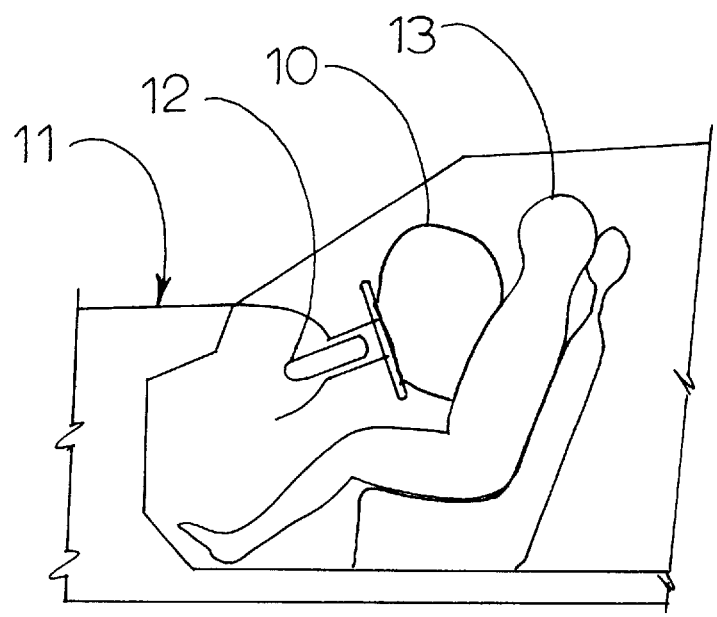
FIG. 1 is a diagrammatic view of a vehicle with a supplemental restraint system that may be used in embodiments of the invention.

Illustrated embodiments of the invention concern systems for inflating a vehicular gas bag 10 with gas from a bottle of compressed gas 12 against an occupant 13 of an automobile or other vehicle in an emergency, such as diagrammatically shown in FIG. 1. The illustrated embodiments of the invention provide the gas bag 10 with a variable gas inlet passage or with an inlet metering orifice, such as shown at 15 in FIGS. 2, 3a to 3c and 4.

The illustrated embodiments also provide a variable gas venting passage 16 or venting metering orifice in circumvention or avoidance of the gas inlet passage 15.

According to a preferred embodiment of the invention, gas pressure of the compressed gas in the bottle 12 is sensed prior to an emergency, such as with a gas pressure sensor 18.

The variable gas inlet passage 15 is varied inversely with sensed gas pressure prior to an emergency, and the variable gas venting passage 16 is varied conversely to such variable gas inlet passage 15 prior to that emergency.

In apparatus terms, the gas pressure sensor 18 has a sensor input 20 coupled to the compressed gas in the bottle 12 prior to an emergency, and has a sensed pressure output 21. The variable gas inlet passage 15 for the gas bag 10 has a gas inlet passage variator 22 coupled to the sensed pressure output 21, and the variable gas venting passage 16 is positioned in circumvention of the gas inlet passage 15 and is inverse to that variable gas inlet passage 15, and has a gas venting passage variator 23 coupled to the sensed pressure output 21. A compressed gas release 25 has a compressed gas outlet 26 on the bottle 12 connected to the variable gas inlet passage 15 and to the variable gas venting passage 16 through a plenum 130.

The gas bag 10 thus is inflated in an emergency with gas at a pressure adapted to safety requirements by opening the bottle of compressed gas 12, such as at 26, to the inversely varied gas inlet passage 15 and to the conversely varied gas venting passage 16 during that emergency, thereby venting excess gas as necessitated by applicable safety requirements, while inflating the gas bag 10 from the bottle of compressed gas 12.

Figure 2:
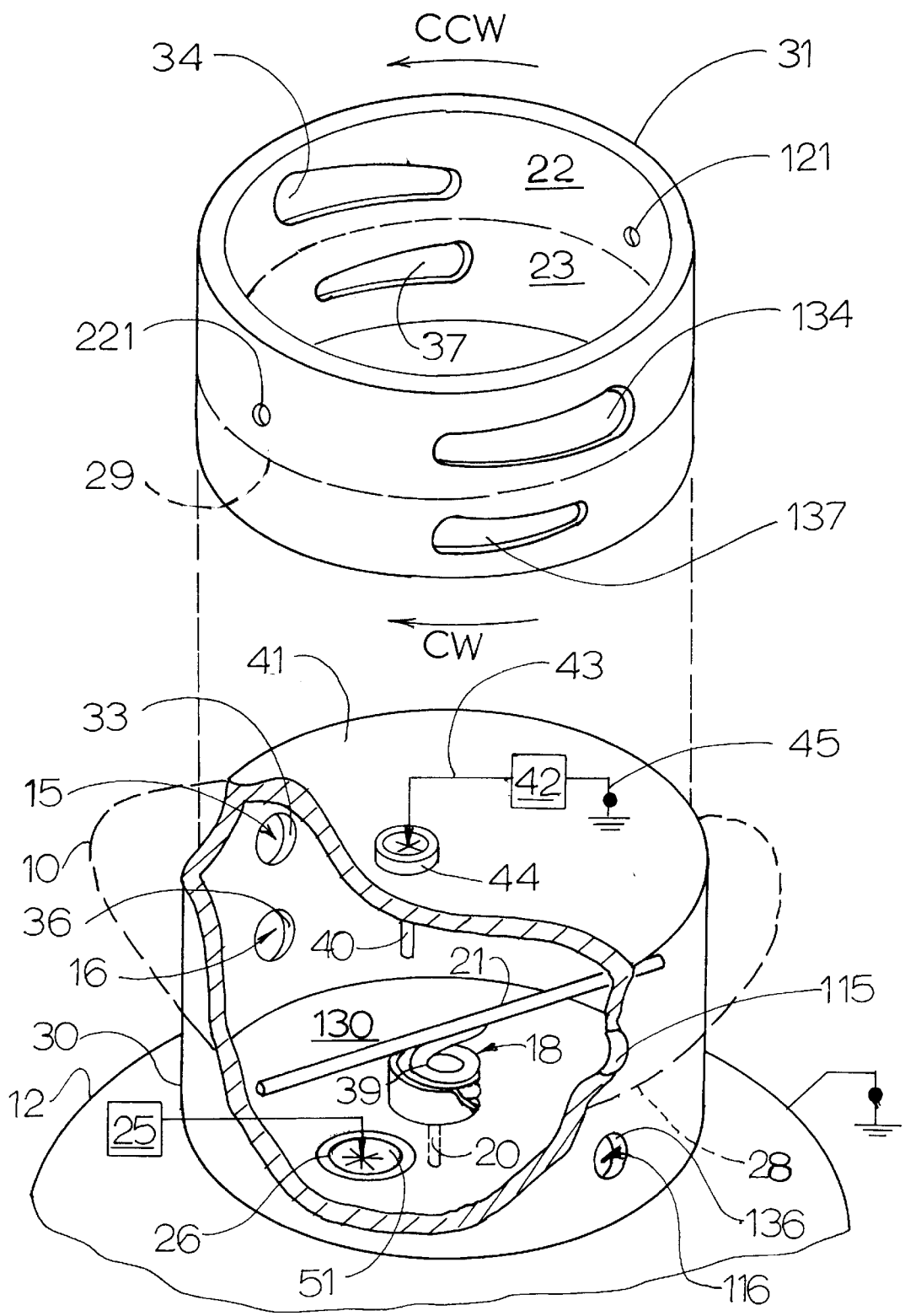
FIG. 2 is a perspective exploded view of parts of a gas bag restraint system that may be used in embodiments of the invention.
Figure 3A:
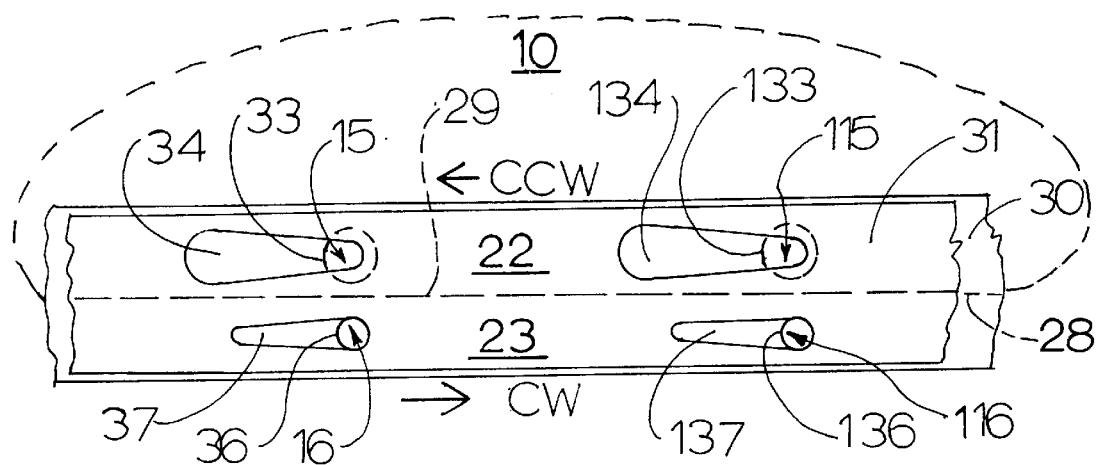
FIGS. 3A, 3B and 3C are developed detail views of part of the embodiment of FIG. 2 at different phases of operation.
Figure 3B:
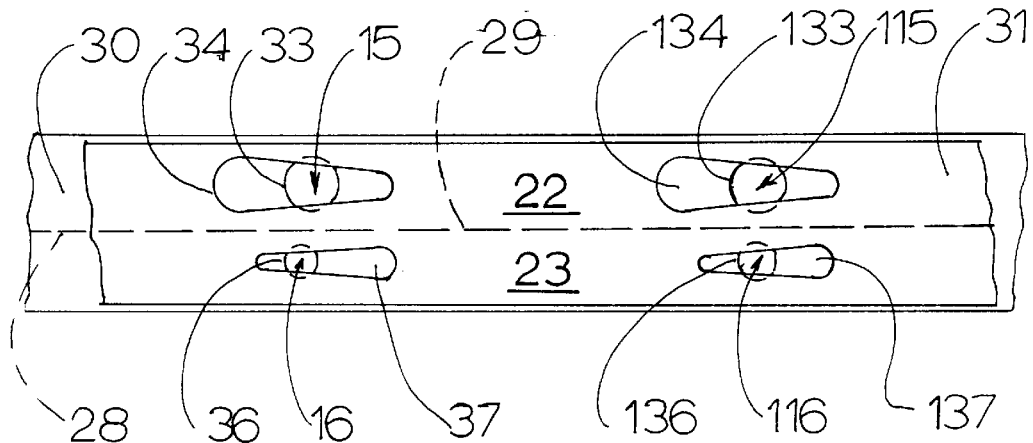
Figure 3C:
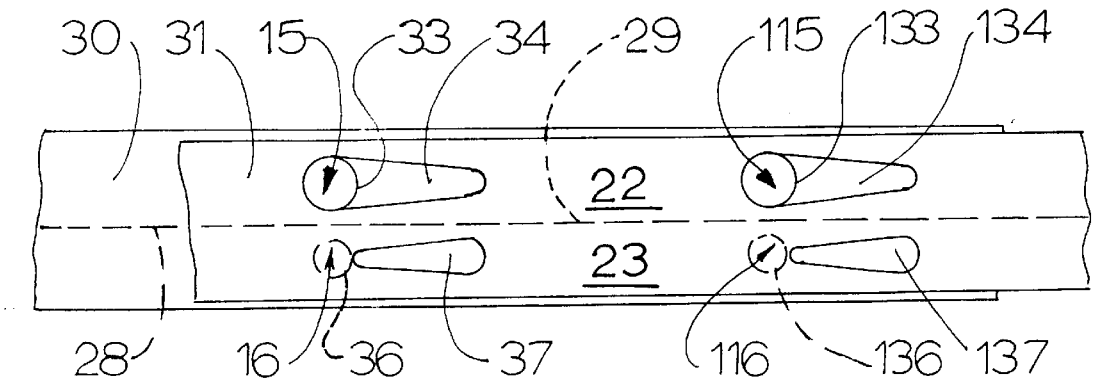

The exploded perspective view of FIG. 2 is supplemented by the plan views of FIGS. 3A to 3C showing the circular variator 22/23 developed or unrolled. In this respect, the expression "variator" is used in its dictionary term, derived from the Latin word "variatus" supplemented by the ending "-or" to mean "a device that varies."

A dotted line 28 in FIG. 2 signifies where the gas bag 10 is attached to a valve housing or stationary sleeve 30 shown in that FIG. 2. A corresponding dotted line 29 on a corresponding rotary sleeve 31 signifies the division between the gas inlet passage variator 22 and the gas venting passage variator 23. The sensed pressure output 21 is coupled to the rotary sleeve 31, such as via apertures 121 and 221 receiving corresponding ends of the pressure sensor output rod at 21.

According to a preferred embodiment of the invention, the gas inlet passage variator 22 includes a metering orifice structure 15 that may, for instance, be composed of a port 33 and a slot 34 combined. Such metering orifice structure is coupled to the sensed pressure output 21 as seen for instance in FIG. 2 for inversely varying that gas inlet passage, such as shown in FIGS. 3A to 3C. The gas venting passage variator 23 similarly may include a metering orifice structure 16 coupled to the sensed pressure output 21 as seen for instance in FIG. 2 for conversely varying that variable gas venting passage, such as shown in FIGS. 3A to 3C.

These metering orifice structures may be ganged with each other or may be provided in a common structure 30 and 31 including the distinct metering orifice structures 15 and 16 and coupled to the sensed pressure output 21, such as via variators 22 and 23. Optional duplicate metering orifice structures 115 and 116, such as with duplicate ports and slots 133 and 134, and 136 and 137, respectively, may be provided in addition to the metering orifice structures 15 and 16 or ports and slots 33 and 34 and 36 and 37 for improved operation.

In this respect the corresponding orifice structures 15 and 115 may be considered generically as an orifice structure 15, and the orifice structures 16 and 116 may be considered generically as an orifice structure 16.

According to the illustrated embodiment of the invention, the gas inlet passage variator includes a metering sleeve coupled to the sensed pressure output 21 and seen for instance at 22 in FIGS. 2 and 3A to 3C for inversely varying the variable gas inlet passage 15. The gas venting passage variator may similarly include a metering sleeve coupled to the sensed pressure output 21 and seen for instance at 23 in FIGS. 2 and 3A to 3C for conversely varying the variable gas venting passage 16.

Within the scope of the invention, these variators or metering sleeves 22 and 23 may be ganged with each other in various embodiments. FIGS. 2 and 3A to 3C show the variators 22 and 23 in one piece 31; an ultimate form of ganging. In this respect, the gas inlet passage variator 22 and the gas venting passage variator 23 may include a common metering sleeve 31 coupled to the sensed pressure output 21.

More specifically, FIGS. 3A to 3C show the rotary inner sleeve or common metering sleeve 31 projected in plan view on a developed or unrolled view of the valve housing or outer sleeve 30 shown in FIG. 2 as stationary relative to its rotary inner sleeve 31 in a common structure of complementary metering sleeves 30 and 31.

FIG. 2 in particular shows the valve housing or stationary sleeve 30 as attached to or sitting on the gas bottle 12 over the normally closed gas bottle opening 26 that is pierced open or otherwise opened by the emergency sensor 25, such as in the case of a severe collision of the vehicle thus equipped.

However, within the scope of the invention, the illustrated valve housing or outer sleeve 30 may in any other manner form a plenum chamber 130 for pressurized gas from the bottle 12 or for the valve system herein disclosed, and may signify any tube or similar conduit connected to a compressed gas supply 12 at its normally closed compressed gas outlet 26.

Moreover, the gas bag 10 may be attached otherwise than to the valve body or outer sleeve 30, and may be supplied with compressed gas from the bottle 12 through conduits running from one or more openings 15, 115 to the otherwise attached gas bag.

The gas pressure sensing, such as with the pressure sensor 18, the inverse variation of the gas bag inlet passage 15 and the converse variation of the gas venting passage 16 preferably are effected continually prior to emergency or impact. In this respect, the expression "continually" is intended to include the related expression "continuously." For instance, the pressure sensor 18 may continuously vary the gas bag inlet passage 15 and the gas venting passage 16 with its sensed pressure output or pressure sensor output 21 in response to gas pressure in the bottle 12, whenever the vehicle is in operation or even while the vehicle is parked or is otherwise not in operation.

FIG. 3A illustrates a first extreme position of the rotary inner metering sleeve 31 relative to the outer stationary sleeve 30. That first extreme position is brought about by maximum overpressure of the compressed gas in the bottle 12, such as generated by a high temperature of the atmosphere or environment in which the gas bottle or vehicle is situated.

The pressure sensor 18 picks up such pressure, such as with its input or inlet 20 in the gas bottle 12, and correspondingly varies or moves its output 21 and thereby the rotary inner sleeve 31 counterclockwise (CCW) as seen in FIG. 2, up to the extreme first angular position illustrated in developed plan view in FIG. 3A.

In that extreme first position, the gas vent or vent metering orifice 16 has its maximum opening or cross-section, while the bag inlet opening or bag inlet metering orifice 15 has its minimum cross-section. It may be noted in this respect that this minimum cross-section of the bag inlet opening 15 is not zero.

Pursuant to a preferred embodiment of the invention, the variable gas inlet passage or metering orifice 15 has or is provided with a cross-section that is greater than zero at any gas pressure in the bottle 12, so that the gas bag 12 will always be inflated in an emergency, typically a severe collision.

On the other hand, the variable gas venting passage or metering orifice 16 is all the way open at the extreme first angular position illustrated in FIG. 3A for the variator 23 or rotary sleeve 31, so that the gas bag 10 cannot be ruptured during inflation in a manner causing injury to the vehicle occupant, even when the ambient temperature or gas pressure is extreme.

The gas venting passage or metering orifice 16 may diminish and even go down to zero during the gas bag inflation process, such as seen in FIGS. 3B and 3C successively, to assure inflation of the gas bag 10 at optimum pressure throughout. Accordingly, depending on initial gas pressure when an emergency is sensed, the gas venting passage or metering orifice 16 is varied from maximum, such as shown in FIG. 3A, to zero, such as shown in FIG. 3C during inflation of the gas bag 10 during that emergency.

Within such extremes the orifices 15 and 16 may maintain a constant area, depending on the clearances between rotary sleeve 31 and stationary sleeve or valve body 30.

Conversely, with decreasing gas pressure in the bottle 12 the gas bag inlet passage or metering orifice 15 is increased toward its maximum, as gas pressure from the bottle 12 decreases as the gas bag 10 is inflated during an emergency.

The relatively stationary sleeve 30 preferably has an inlet port 33 for the gas bag 10, while the rotary sleeve 31 has a corresponding slit 34 of increasing width in terms of decreasing gas pressure for the variable gas inlet passage 15. That port 33 and corresponding slit 34 may form the variable metering orifice at 15.

In general terms within the scope of a preferred embodiment of the invention, the variable gas inlet passage 15 is provided with a taper, such as shown at 34.

In this respect and in general, the variable gas inlet passage 15 preferably is varied gradually, and the gas inlet passage variator 22 is a gradual variator. By way of example, the slit 34 is gradually increasing in width in terms of decreasing gas pressure or in counterclockwise direction (CCW) as seen in FIGS. 2 and 3A to 3C whereby the gas bag inlet passage 15 is most open at minimum gas supply pressure, such as illustrated in FIG. 3C.

In the illustrated embodiment of the invention, the relatively stationary sleeve 30 has a gas venting port 36, while the rotary sleeve 31 has a corresponding slit 37 increasing in width in terms of increasing gas pressure for the variable gas venting passage 16. That port 36 and corresponding slit 37 may form the variable metering orifice at 16.

In general terms within the scope of a preferred embodiment of the invention, the variable gas venting passage 16 is provided with a taper, such as shown at 37.

In this respect and in general, the variable gas venting passage 16 preferably is varied gradually, and the gas venting passage variator 23 is a gradual variator. By way of example, the venting slit 37 is gradually increasing in width in terms of increasing gas pressure or in clockwise direction (CW) as seen in FIGS. 2 and 3A to 3C.

It may be noted that the gas bag inlet slit 34 and the gas venting slit 37 taper in opposite directions.

In practice, either or both ports 33 and 36 may be provided in the rotary sleeve or valve body 31, while either corresponding slit 34 or 37, or both slits 34 and 37, may be provided in the relatively stationary sleeve or valve housing 30.

In this respect, while the well-known expression "port" has been used for the openings 33 and 36, such gas flow openings may be slits within the scope of the invention. For instance, the gas flow openings 33 and 34 may be countervailing slits or elongate openings jointly forming the variable gas bag inlet passage 15, rather than a circular opening and an elongate opening. The same applies to the gas venting passage 16, which may be formed of a circular port 36 and elongate slit 37, or of corresponding countervailing slits at 36 and 37.

Accordingly, the variable gas inlet passage or metering orifice 15 and/or the variable gas venting passage or metering orifice 16 can be designed for any linear or non-linear operation, as best suited for an optimum inflation of the gas bag 10, at optimum relative proportioning of gas flow to the bag 10 and gas flow through the vent 16, for the best possible net gas flow to and inflation of the gas bag 10 at all pressures and temperatures.

Reverting to FIGS. 3A to 3C, a gas bag inflation process may start at a gas passage variator or slit position, as shown in FIG. 3A, and FIGS. 3B and 3C may illustrate variator or slit positions developing during an inflation of the gas bag 10, such as described above. However, an actual inflation may, for instance, start at the variator or slit position illustrated in FIG. 3B or even at the variator or slit position shown in FIG. 3C.

In fact, FIG. 3B may well represent the typical case of inflation of the gas bag 10 at an average temperature or gas supply pressure in the bottle 12. In that case, the gas pressure sensor, through its output or gas passage variator actuator 21, has driven the rotary metering sleeve 31 clockwise (CW) as seen in FIGS. 2 and 3A, or has driven the rotary metering sleeve counterclockwise (CCW) from the position illustrated in FIG. 3C, until it has arrived at the angular position illustrated in FIGS. 3B. All of this may and typically will take place prior to an emergency.

However, if an emergency strikes at that moment, the bag 10 will be inflated with pressurized gas from the bottle 12 through the gas inlet passage or metering orifice 15 as illustrated in FIG. 3B, while excessive gas will be vented through the gas venting passage or metering orifice 16 also as illustrated in that FIG. 3B, thereby assuring gas bag inflation at optimum protection of the particular vehicle occupant, without adverse effects from the gas inflation itself.

In this respect, the gas bag inlet passage or metering orifice 15 may be opened and the gas venting passage or metering orifice 16 may be correspondingly closed down to the extreme shown in FIG. 3C if necessary, to insure optimum inflation of the gas bag 10 during any inflation process.

Rarely, the bag inflation process may start at the variator and slit positions illustrated in FIG. 3C, such as when ambient temperature is very low.

An optimum design of metering sleeves 30 and 31 or of other gas passage variators is such that FIG. 3A would represent or signify the highest contemplated temperature and gas supply pressure condition, while FIG. 3C would represent or signify the lowest temperature or gas supply pressure condition contemplated for a given application, with FIG. 3B representing or signifying an intermediate or average environmental temperature or gas pressure condition in the bottle 12.

The invention varies the variable gas inlet passage or metering orifice 15.inversely with the sensed gas pressure; that is it diminishes the passage or orifice 15 with increasing gas pressure, such as seen in FIG. 3B relative to FIG. 3C, and in FIG. 3A relative to FIG. 3B, and it conversely increases the passage or orifice 15 with decreasing gas pressure, such as seen in FIG. 3B relative to FIG. 3A, and in FIG. 3C relative to FIG. 3B.

The variable gas venting passage or metering orifice 16 is inverse to the variable gas inlet passage or metering orifice 15, such as seen in FIGS. 2 and 3A to 3C where the venting slits 37 and the gas bag inlet slits 34 run inversely to each other from small to large widths.

In this or any other manner within the scope of the invention, the gas venting passage or metering orifice 16 is varied conversely to the variable gas bag inlet passage or metering orifice 15.

The gas pressure in the bottle 12 may be sensed electrically, mechanically or in any other manner. The illustrated embodiment senses the gas pressure in the bottle 12 mechanically. By way of example, the gas pressure sensor 18 may be a mechanical gas pressure sensor including a Bourdon tube 39 or another sensing element as the pressure sensitive element.

A preferred embodiment of the invention provides a resilient element such as at 39 for sensing the gas pressure in the bottle 12, and deflects such resilient element with the compressed gas from that bottle already prior to an emergency, varying the variable gas inlet passage 15 and the variable gas venting passage 16 with that deflecting resilient element, such as at 21, 22, 23.

In apparatus terms, the gas pressure sensor 18 has a resilient gas pressure sensing element, such as at 39, having a gas pressure input 20 coupled to the compressed gas in the bottle 12 already prior to an emergency and having a sensed pressure output, such as at 21, coupled to the gas inlet passage variator, such as at 22, and to the gas venting passage variator, such as at 23, or otherwise within the scope of the invention.

According to the embodiment of the invention illustrated in FIG. 2, the mechanical gas pressure sensor 18 includes a Bourdon tube 39 having an input 20 coupled to the compressed gas in the bottle 12, and having a sensed pressure output 21 coupled to the gas inlet passage variator 22 and to the gas venting passage variator 23.

More specifically, such Bourdon tube 39 has one end open as a pressure inlet 20 in the gas bottle, with the opposite end closed and coupled to the sensed pressure output or carrying an output rod 21. In practice, such rod 21 may perform the function of a pressure indicator in a Bourdon gauge. The Bourdon tube may have the form of a Bourdon spring.

Such Bourdon tube or spring has an inherent resiliency. If pressure from the gas bottle 12 increases through input 20, the tube or spring 39 tends to unwind, thereby turning or angularly moving the pressure output or indicator rod 21 and thereby the common metering sleeve 31 counterclockwise (CCW) as seen in FIGS. 2 and 3A to 3C, which decreases the effective aperture of the gas bag inlet metering orifice 15, such as shown successively in FIGS. 3C to 3A, while correspondingly or conversely increasing the effective aperture of the gas venting or metering orifice 16, such as shown successively also in FIGS. 3C to 3A.

If thereafter the pressure from the gas bottle 12 decreases via gauge input 20, the tube or spring 39 rewinds or reverts to its contracted original or rest position, thereby turning or angularly moving the pressure output or indicator tube 21 and thereby the common metering sleeve 31 clockwise (CW) as seen in FIGS. 2 and 3A to 3C, which increases the effective aperture of the gas bag inlet metering orifice 15, such as shown successively in FIGS. 3A to 3C, while correspondingly or conversely decreasing the effective aperture of the gas venting or metering orifice 16, such as shown successively also in FIGS. 3C to 3A.

According to a further embodiment of the invention, a pressure indicator 40 goes from within a range of operation of the sensor output arm 21 in the plenum chamber 130 above the gas bottle 12 through the top 41 of the valve body or plenum chamber 130 in the valve housing or sleeve 30. That indicator may for instance be an electric indicator contact so positioned that when the gas in the bottle 12 is at a minimum pressure, the pressure sensor 18 or Bourdon tube 39 will bring its sensor output arm 21 into contact with the indicator 40 providing a low-pressure indication signal. By way of example, FIG. 2 shows an electric signalling device 42 that, for example may include the automobile battery or another electric power source and an electric signal lamp or other alarm or signalling device, or automotive ignition inhibitor, connected in series with the electric power source. Such signalling device 42 is connected through electric wiring 43 to the low-pressure indicator 40. The indicator 40, while electrically conductive, may be electrically insulated from the top 41 and isolated or insulated from the bottle 12. An insulating washer 44 is shown in FIG. 2 as an electric insulator for electrically insulating the indicator 40 from the valve housing top 41; that is, from ground 45, in the illustrated embodiment. The pressure sensor output rod 21, on the other hand, is electrically grounded via Bourdon tube or other resilient pressure sensing element 39.

In this manner, an electric alarm may be activated or an automobile deactivation may be initiated when the pressure sensing output arm 21 contracts the indicator 40 at minimum gas pressure, providing an electrical path to actuate the low pressure warning system 42 via wiring 43 and ground 45.

In addition to providing a warning signal, or quite independently therefrom, the indicator 40 provides a stop for the clockwise (CW) motion of the metering sleeve 31. This prevents the sensor output arm 21 from driving the metering sleeve 31 past the low pressure position shown in FIG. 3C and thereby prevents the gas bag inlet orifice 15 from being diminished below its maximum aperture shown in FIG. 3C when the gas pressure in the bottle 12 is lowest.

Figure 4:
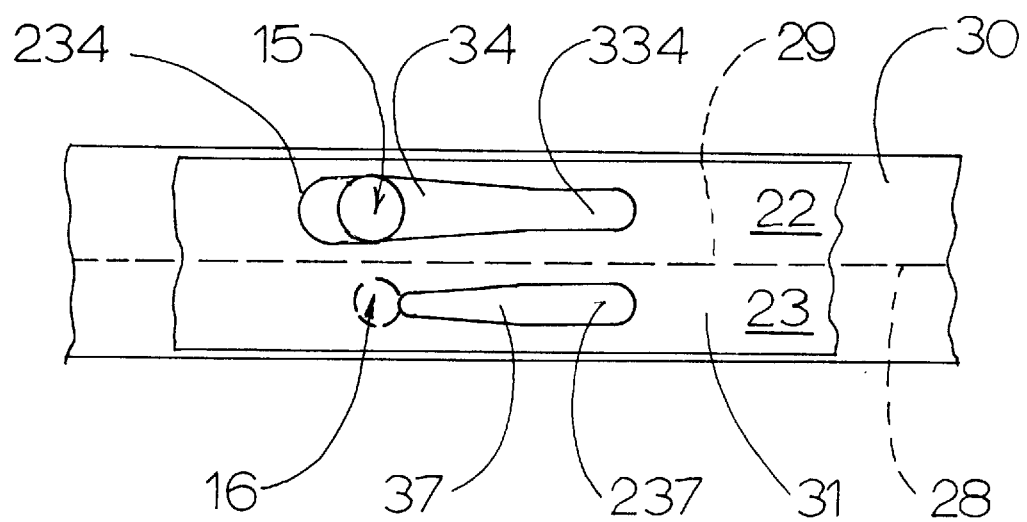
FIG. 4 is a view similar to FIG. 3C showing a modification that may be used in embodiments of the invention.

FIG. 4 shows a modification of the metering sleeve 31, according to which the metering slit 34 is extended, being provided with an extension 234 beyond the slit 34 seen in FIG. 3C.

Figure 5:
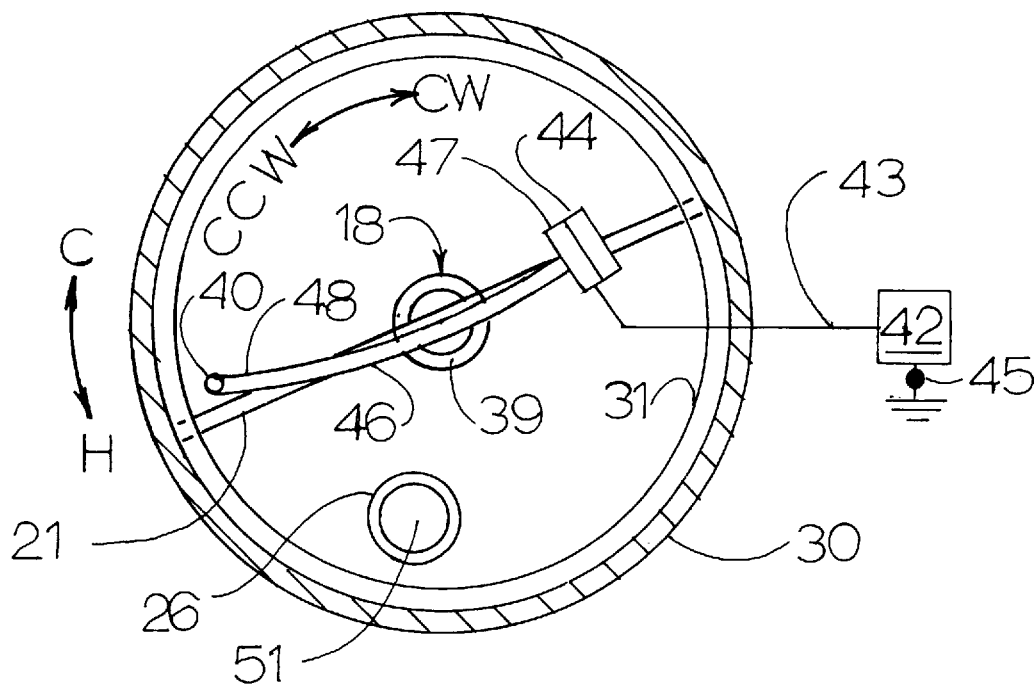
FIGS. 5 and 6 are partially sectioned top views of an arrangement similar to that of FIG. 2, but with a temperature compensation that may be used in embodiments of the invention.
Figure 6:
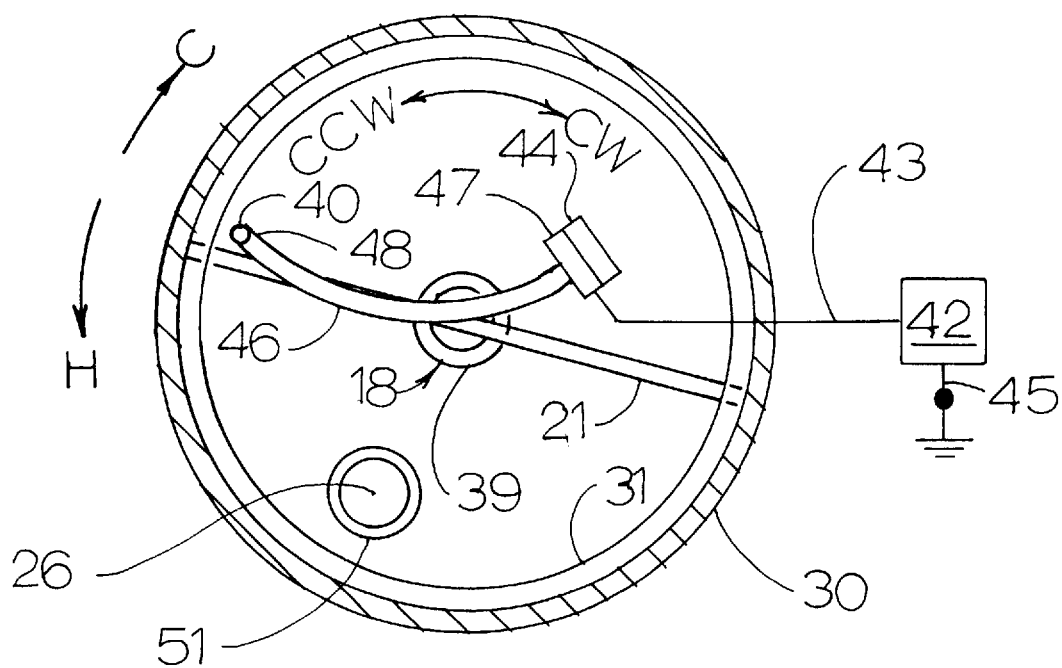

In other words, the otherwise tapered or diverting metering slit 34 for the gas bag inlet metering orifice 15 is at its maximum diversion provided with an extension 234 whereby or so that gas bag inlet orifice 15 cannot diminish or close while the gas pressure drops, even if the stop or pressure indicator 40 is not present, or if such stop is moving, as in the embodiment of FIGS. 5 and 6. The extension 234 may have sides substantially in parallel to the direction of movement (e.g. CW and CCW) of the metering sleeve 31. A pressure indicator or stop similar to the pressure indicator or stop 40 may be provided to prevent total closure of the variable gas bag inlet passage 15, even if the compressed gas in the bottle 12 reaches excessive pressures. In that case, an alarm may be sounded or the vehicle may be shut down by the use of a circuit similar to the alarm circuit 42 described above.

In broad terms, the stop 40 in effect provides a stop for the variable gas inlet passage 15 and additionally or alternatively for the variable gas venting passage 16. Such stop may for such purpose be coupled to the sensed pressure output 21 or may be positioned wherever it will stop the variator 22 or the variator 23 or the rotary sleeve 31 in either direction, as desired.

The signalling device 42 signals extreme pressures of the compressed gas in the bottle 12 and in that sense serves as a so-called extreme-gas-pressure signalling device.

The otherwise tapered or diverting metering slit 34 for the gas bag inlet metering orifice 15 is at its minimum diversion or taper provided with an extension 334 having sides substantially in parallel to the direction of movement (e.g. CW or CCW) of the metering sleeve 31. Within the scope of this embodiment, the sides of the extension 334 need not be parallel, but need to be less inclined than the taper at 34, in the direction at movement of the variable gas inlet passage, whereby or so that the gas bag inlet orifice 15 cannot diminish or close totally while the gas pressure reaches excessive levels, even if no overpressure indicator or stop is present or if such stop is moving, as in the embodiments of FIGS. 5 and 6.

The tapered gas venting slit 37 may be provided with an extension 237, such as shown in FIG. 4, that may be similar in structure to the extension 234, but that corresponds to the extension 334 in the gas bag inlet slit 34. In this or any other manner within the scope of the invention, the illustrated embodiment assures that the pressure of gas applied to the bag 10 remains within a range acceptable from a safety point of view.

In practice, the Bourdon tube 39 or pressure sensor 18 need not be concentric of the rotary sleeve 31. For instance, the pressure sensor 18 may be located more or less where the normally closed bottle opening 26 is shown, or may otherwise be eccentrically situated relative to the rotary sleeve 31. In such case, the pressure sensor output rod 21 may be telescopic or the rotary sleeve 31 may have inwardly projecting radial lugs (not shown) to prevent disengagement of the rod 21 from the sleeve 31 as the deflection of such sensor output rod 21 is progressing clockwise (CW) or counter-clockwise (CCW) with diminishing or increasing bottled gas pressure.

The illustrated combinations of valve housing and valve body or stationary sleeve and rotary sleeve combinations 30 and 31 with orifices 33 and 36 and tapered and other slits, such as at 34, 37, 134, 137, 234, 237 and 334, may be viewed as a rotary shutter. Within the scope of the invention, such a shutter could be linear or translatory, such as by being composed of parallel plates arranged between the normally closed gas bottle outlet 26 and the inlet of the gas bag 10.

The subject invention in its operation relies on pressure sensing, rather than mere temperature sensing. However, within the scope of the invention, temperature sensing may be combined with pressure sensing or pressure sensing may be temperature compensated.

An example of this is shown in FIGS. 5 and 6, being somewhat schematic top views of the embodiment of FIG. 2 with temperature compensation added.

According to the embodiment illustrated in FIGS. 5 and 6, a temperature compensator includes a temperature-sensitive element in combination with the gas pressure sensor 18. Such temperature-sensing element has a deflective free end 48 mounting the stop or alarm circuit contact 40. In FIGS. 5 and 6, the stop 40 disclosed above in the context of FIG. 2, is mounted on a temperature-responsive bimetallic strip 46.

By way of example, the bimetallic strip 46 may be anchored on a typically stationary post 47 that may, for instance, depend from the top 41 of the valve 1069 housing 30 or plenum chamber 130. The bimetallic strip 46 in the plenum chamber 130 may have a free end 48 on which the stop 40 is mounted. Such stop is thus moveable in the embodiment of FIGS. 5 and 6, rather than being typically stationary, as in FIG. 2, for instance.

As the stop 40 in the embodiment of FIG. 2, the post 47 in the embodiment of FIGS. 5 and 6 may be electrically insulated from the valve housing top 41, such as by electric insulation similar to the insulator 44. In other words, the post 47 shown in FIGS. 5 and 6 may be mounted from the top 41 (see FIG. 2) in an electrically insulated manner, whereby the electric signalling, alarm or deactivation circuitry 42, 43, 45 may again be used and may be activated via the bimetallic strip 46 when the pressure sensor output rod 21 contacts the stop or indicator contact 40.

In particular, in the embodiment of FIGS. 5 and 6 the stop 40 is moveable as a function of environmental temperature at or in the gas bottle 12. Letters H for "hot" and C for "cold" and corresponding arrows thereat indicate how the free end 48 of bimetallic strip 46 and thereby the stop 40 would move as a function of temperature.

In this respect, FIG. 5 shows a typical position of the temperature-dependent stop 40 for higher temperatures, while FIG. 6 illustrates a different position of the temperature-dependent stop 40 for lower temperatures; with the adjectives "lower" and "higher" being here used relative to each other.

Comparing FIGS. 5 and 6, it is seen that it takes more angular movement in clockwise direction (CW) for the pressure sensor output rod 21 to reach the stop 40 when the temperature is low, as in FIG. 6, as opposed to high as in FIG. 5.

Pursuant to Boyle's law, gas pressure increases with increasing temperature, but decreases with decreasing temperature, relatively speaking.

Accordingly, as temperatures are dropping, both the pressure sensing output rod 21 and the stop 40 will move clockwise (CW) as seen in FIG. 6 relative to FIG. 5. Conversely, if temperatures are rising, both the pressure sensing output rod 21 and the stop 40 will move counter-clockwise (CCW), as seen in FIG. 5 relative to FIG. 6.

In this respect, if the embodiment of FIG. 2 is now viewed in terms of FIGS. 5 and 6, it is seen retrospectively that the operation of the embodiment of FIG. 2 is in effect temperature dependent as to stop 40, to the extent that temperature and thereby pressure variations within the gas bottle 12 cause the pressure sensor output or output rod 21 to move, but do not cause the stop 40 to move correspondingly. In consequence, it is possible that the circuitry 42 or other alarm system may signal an unacceptably low supply of gas in the bottle 12, while there in fact is still enough compressed gas left in the bottle 12 for a complete bag inflation or other desired purpose, even at low temperature.

In many applications, such as in regular vehicular supplemental restraint systems, this may be tolerable. However, there are more sophisticated applications where a temperature compensation of pressure sensitive systems is desirable. By way of utility, supplemental restraint systems for operation in extremely high and/or low temperature ranges are mentioned here by way of example, but not by way of limitation.

The embodiment of the invention illustrated in FIGS. 5 and 6 in effect compensates temperature-induced pressure variations of the compressed gas. By way of example, a stop, such as shown at 40, may be provided with a temperature compensation, such as shown at 46 to 48 in FIGS. 5 and 6.

In the context of FIGS. 2, 5 and 6, a system for signaling extreme pressures of the compressed gas in the bottle 12 has been disclosed, such as with the aid of components 21, 40, 42, and 43. Such signaling system may be temperature-compensated such as in the manner illustrated in FIGS. 5 and 6, providing, for instance, the temperature-sensitive bimetallic strip 46 and the stop 40 at a free end 48 thereof.

The temperature compensation in the embodiment of FIGS. 5 and 6 is such that (a) as temperature decreases, the bimetallic strip 46 moves the stop 40 clockwise (CW) ahead of the pressure sensor output rod 21, and (b) as temperature decreases, that bimetallic strip moves the stop 40 counter-clockwise (CCW) after that pressure sensor output rod. In other words, the pressure sensor output rod 21 "chases" the stop 40 when temperature decreases, while that stop in turn "chases" that pressure sensor output rod when temperature increases. The stop 40 will thus remain spaced from or ahead of the pressure sensor output rod 21 as long as gas compressed in the bottle 12 remains of sufficient quantity for inflation of the gas bag 10 in an emergency or for another purpose within a given utility, even at low temperatures.

On the other hand, if the gas compressed in the bottle 12 falls below a quantity sufficient for inflation of the gas bag 10 in an emergency or for another purpose within a given utility, then the pressure sensor output rod 21 will catch up with the stop 40 positioned at the then prevailing temperature by the bimetallic strip 46. In this manner, an alarm, signaling or deactivation device 42 may thus be activated, such as in the above mentioned manner.

The system shown in FIGS. 5 and 6 functions as a temperature-responsive compensator for the pressure-sensing operation or, in short, as a "sensed pressure temperature compensator." By way of example, such temperature compensator includes the bimetallic strip 46 or another temperature-responsive mount for the stop 40.

Where the elements 21 and 40 shown in FIG. 2 are normally open, but selectively closeable electrical contacts for an electric signaling device 42, the bimetallic strip 46 or another temperature-sensing element, has a deflective free end 48 mounting-such contact 40, referred to herein also as "stop."

Accordingly, an alarm condition is signaled by the device 42 as soon as the pressure sensor output rod 21 has contacted the stop or contact 40 whose position varies with temperature.

Reverting to FIG. 2, it is understood from the prior art that the bottle has a compressed gas outlet 26 which is normally closed; but which may be opened by a compressed gas release 25, such as in an emergency requiring inflation of the gas bag 10.

Typically, the bottle 12 is closed with a burst diaphragm 51 at the factory or otherwise upon completion of its fill with compressed gas. While the inflatable bags of supplemental restraint systems still are universally called "air bags," even in current patents, air is seldom, if ever, still used as a compressed gas for such inflatable bags. Rather, the compressed gas in the bottle 12 typically is an inert gas or gas mixture. In principle, inert gases may include Argon, Helium, Nitrogen and Krypton. In practice, some of these may be too expensive or relatively heavy or voluminous, with Helium being herein favored for embodiments of "air bag" restraint systems.

A burst diaphragm of the type herein shown is penetrated upon occurrence of an emergency, such as by or with the compressed gas release 25. In this or any other manner within the scope of the invention, the compressed gas outlet has a closed position, such as when the burst diaphragm 51 is intact, and has an alternative open position, such as when the burst diaphragm has been pierced or otherwise penetrated.

An embodiment of this invention effects the opening of the bottle of compressed gas 12 in phases of compressed gas flow in case of an emergency.

A version of such embodiment of the invention is shown by way of example in FIGS. 7 to 10.

Figure 9:
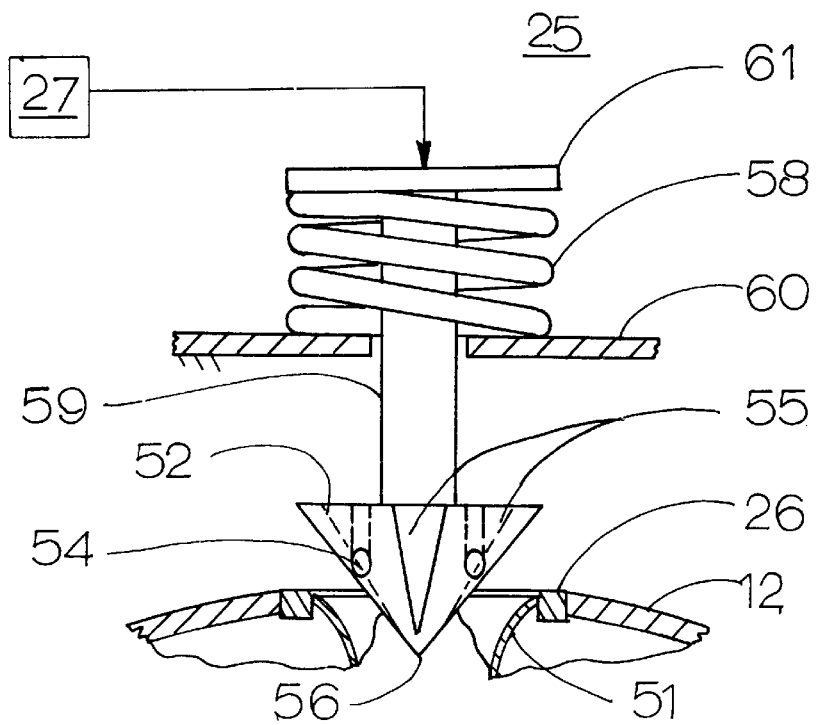
Figure 10:
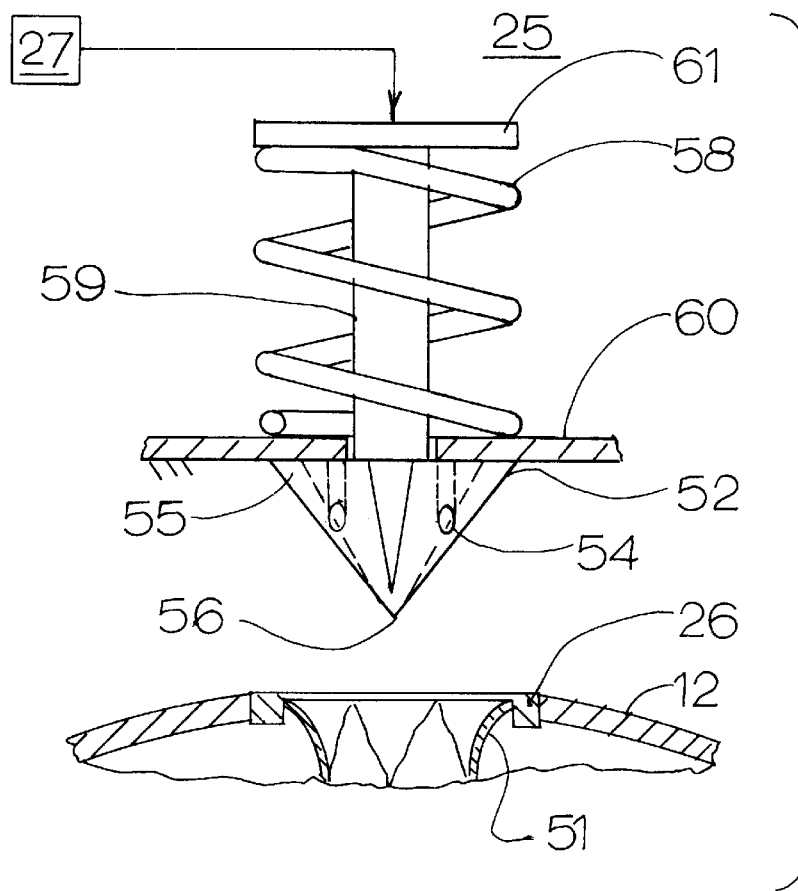

In particular, FIGS. 7 to 10 show the compressed gas release 25 equipped with a shuttle 52 having a first position, such as shown in FIGS. 7 and 10, wherein the shuttle is spaced from the compressed gas outlet 26 or burst diaphragm 51 before and after opening of the compressed gas outlet, and having a second position at the compressed gas outlet 26, such as shown in FIG. 8.

The present embodiment of the invention provides one or more temporary compressed gas flow restrictions at the compressed gas outlet in the alternative open position of that compressed gas outlet 26. As seen in FIGS. 7 to 10, such gas flow restrictions may for instance be in the form of one or more bores or orifices 54 through the shuttle 52 or may be in the form of lateral grooves 55 along that shuttle, for instance. FIGS. 7 to 10 show both types of gas flow restrictions at the same time. However, either orifices or grooves or a combination of orifices and grooves may be employed for suitable gas flow restrictions, as required or as desired in a given applications.

From one aspect thereof, FIG. 7 shows the shuttle 52 in a quiescent position, such as during normal use of the vehicle or otherwise prior to impact or similar emergency. On the other hand, FIG. 8 shows the shuttle 52 advanced to the bottle outlet 26 where it provides the flow restrictions 54 and/or 55 at the then open bottle outlet.

In this or any other manner within the scope of the invention, the compressed gas outlet 26 has a closed position, such as shown in FIGS. 2 and 7, and has an alternative open position, such as shown in FIGS. 8 to 10, and has in that open position a temporary compressed gas flow restriction, such as shown at 54 and 55 in that FIG. 8.

FIG. 8 thus shows an initial phase wherein flow of compressed gas from the bottle 12 to the gas bag 10 is restricted. This may be followed by a subsequent phase, such as shown in FIG. 9 or 10, wherein flow of compressed gas from that bottle is unrestricted, especially when considered relative to the flow restriction shown in FIG. 8.

When viewed with respect to FIGS. 7 and 10, FIG. 9 may be considered illustrating a kind of intermediate position wherein the shuttle 52 is withdrawn or otherwise spaced from the gas outlet 26, but is still within the stream of compressed gas from the opened bottle 12.

The compressed gas release according to the embodiment shown in FIGS. 7 to 10 comprises a compressed gas release pulse shaper which includes the temporary compressed gas flow restriction 54 and/or 55, such as in a shuttle 52 which is temporarily present in the gas outlet 26, such as shown in FIG. 8.

Where the bottle 12 is closed with a burst diaphragm 51, such as shown in FIGS. 2 and 7, such burst diaphragm is penetrated upon occurrence of an emergency, and the present embodiment momentarily reduces flow of compressed gas from the bottle at such burst diaphragm or then opened gas outlet 26, such as disclosed above in the context of FIG. 8. The present embodiment thereafter removes such reduction of flow of compressed gas from the bottle at the now penetrated burst diaphragm or gas outlet.

The shuttle 52 may include or may constitute a burst diaphragm penetrator 56. By way of example, where the compressed gas outlet 26 has a burst diaphragm 51 effecting its closed position, such as shown in FIGS. 2 and 7, the compressed gas release pulse shaper or shuttle 52 includes a burst diaphragm penetrator 56 having a first position spaced from that compressed gas outlet before and after opening of such compressed gas outlet, such as shown in FIGS. 7 and 10, and having a second position at that compressed gas outlet after penetration of the burst diaphragm by penetrator 56, such as shown in FIG. 8. The burst diaphragm penetrator preferably includes a temporary compressed gas flow restriction at the compressed gas outlet, such as shown at 54 or 55, in the alternative open position of that compressed gas outlet after penetration of the burst diaphragm by that penetrator 56.

The compressed gas release 25, shuttle 52 or burst diaphragm penetrator 56 includes a selectively actuable first-to-second position propellant 27, such as shown in FIGS. 7 to 10. Such propellant may be a squib or other explosive charge that is set off in response to a sensing of an impact or other emergency requiring inflation of the gas bag 10. However, within the scope of the invention, electromagnetic or electromechanical forces may be used as "propellants" so to speak for speeding the shuttle or penetrator from its first position, such as shown in FIG. 7, toward the burst diaphragm 51 or gas bottle outlet 26 or to its second position, such as shown in FIG. 8, for a rapid piercing of the burst diaphragm.

In addition, the shuttle 52 or penetration 56 may include an automatic second-to-first position actuator. By way of example, a return spring 58 may be provided for repelling the shuttle or penetrator from its second position shown in FIG. 8, to its first position, such as shown in FIG. 10, which as such may be the same first position as shown in FIG. 7.

The different phases of operation shown in FIGS. 7 to 10 in effect shape the pulse, so to speak, of the compressed gas flowing from the bottle 12 for inflation of the gas bag 10 in an emergency. Owing to the initial gas flow restriction, such as disclosed in the context of FIG. 8, the gas bag will be inflated more gently than if compressed gas where released at an unrestricted rate so that the gas bag would fly against the vehicle occupant 13, thereby throwing the same backward or even injuring such unfortunate individual. Also, from the possibility of an intermediate position such as shown in FIG. 9, it may be seen that the pulse or impulse of compressed gas release to the bag 10 may be shaped further. Other shaping is possible through such factors as number and size of flow restriction passages and dimensioning of the return spring 58, both with respect to its resistance to the propulsion of the shuttle or penetrator from the first position shown in FIG. 7 to its second position shown in FIG. 8, and also with respect to its return propulsion of the shuttle or penetrator back to the first position now shown in FIG. 10, optionally through an intermediate position, such as shown in FIG. 9.

The shuttle 52 or penetrator 56 may include or be mounted on a shaft or valve stem 59 which extends through a typically stationary plate 60 that also mounts the spring 58. Such bias spring may thus act between the plate 60 and a plate or valve stem termination 61 that is attached to an end of the shaft 59 opposite the shuttle 52.

The embodiment shown in FIGS. 7 to 10 is particularly well suited for optimum improved gas bag inflation in combination with the embodiments shown in FIGS. 2 to 4, 5 and 6, for instance. However, the phased or shaped compressed gas release from the bottle 12, such as disclosed in the context of FIGS. 7 to 10, has utility beyond or independent of the embodiment of FIGS. 2 to 4, 5 and 6.

In this respect and by way of example, the embodiment of FIGS. 5 and 6 and the embodiment of FIGS. 7 to 10 can be used in combination with one another, and such combination or either of these embodiments can be used for sensing or signalling gas pressure in a bottle or for discharging gas from a bottle of compressed gas for inflating any gas bag or for any other purpose in any application. For instance, the embodiment of FIGS. 5 and 6 may in effect be used for determining or signalling the condition of a compressed gas container and of its contents through sensing such gas pressure in a temperature-compensated manner.

Moreover, this extensive disclosure will render apparent or suggest to those skilled in the art various modifications and variations within the spirit and scope of the invention.

We claim:

1. In apparatus for discharging gas from a bottle of compressed gas, the improvement comprising in combination:
   a compressed gas release having a compressed gas outlet on said bottle;
   said compressed gas outlet having a closed position and an alternative open position; and
   a shuttle having a first position spaced from said compressed gas outlet before and after opening of said compressed gas outlet and having a second position at said compressed gas outlet;
   said shuttle including a temporary compressed gas flow restriction at said compressed gas outlet in said alternative open position of said compressed gas outlet.

2. Apparatus as in claim 1, wherein:
   said compressed gas release includes a compressed gas release pulse shaper including said shuttle.

3. Apparatus as in claim 1, including:
   an extreme-gas-pressure signaling device.

4. Apparatus as in claim 3, including:
   a temperature compensation of said signaling device.

5. Apparatus as in claim 1, for inflating a vehicular gas bag with gas from a bottle of compressed gas against an occupant in an emergency, including:
   a gas inlet passage for said gas bag connected to compressed gas outlet.

6. Apparatus as in claim 5, wherein:
   said gas inlet passage for said gas bag includes a gas inlet passage variator between said compressed gas outlet and said gas bag.

7. In apparatus for discharging gas from a bottle of compressed gas, the improvement comprising in combination:
   a compressed gas release having a compressed gas outlet on said bottle;
   a burst diaphragm closing said compressed gas outlet; and
   a burst diaphragm penetrator having a first position spaced from said compressed gas outlet before and after opening of said compressed gas outlet and having a second position at said compressed gas outlet after penetration of said burst diaphragm by said penetrator;
   said burst diaphragm penetrator including a temporary compressed gas flow restriction at said compressed gas outlet after penetration of said burst diaphragm by said penetrator.

8. Apparatus as in claim 7, wherein:
   said burst diaphragm penetrator includes a selectively actuable first-to-second position propellant.

9. Apparatus as in claim 7, wherein:
   said burst diaphragm penetrator includes an automatic second-to-first position actuator.

10. Apparatus as in claim 7, including:
    an extreme-gas-pressure signaling device.

11. Apparatus as in claim 10, including:
    a temperature compensation of said signaling device.

12. Apparatus as in claim 7, for inflating a vehicular gas bag with gas from a bottle of compressed gas against an occupant in an emergency, including:
    a gas inlet passage for said gas bag connected to said compressed gas outlet.

13. Apparatus as in claim 12, wherein:
    said gas inlet passage for said gas bag includes a gas inlet passage variator between said compressed gas outlet and said gas bag.

14. In a method of discharging gas from a bottle of compressed gas, the improvement comprising in combination:
    closing said bottle with a burst diaphragm;
    subsequently penetrating said burst diaphragm;
    momentarily reducing flow of compressed gas from said bottle at the penetrated burst diaphragm; and
    thereafter removing the reduction of flow of compressed gas from the bottle at the penetrated burst diaphragm.

15. A method as in claim 14, including:
    inflating a gas bag with gas discharging from said bottle.

16. A method as in claim 14, wherein:
    discharge of gas from said bottle of compressed gas is effected in phases of compressed gas flow including the momentary reduction of flow of compressed gas from said bottle at the penetrated burst diaphragm.

17. A method as in claim 14, wherein:
    discharge of gas from said bottle of compressed gas is effected in phases of compressed gas flow including an initial phase wherein flow of compressed gas from said bottle is restricted by the momentary reduction of flow of compressed gas from said bottle at the penetrated burst diaphragm, and a subsequent phase wherein flow of compressed gas from said bottle is unrestricted.

18. A method as in claim 14, wherein:
    flow of compressed gas from said bottle is momentarily reduced by a gas flow restriction at the penetrated burst diaphragm.

19. A method as in claim 18, including:
    inflating a gas bag with gas discharging from said bottle.

20. A method as in claim 14, including:
    providing a burst diaphragm penetrator;
    penetrating said burst diaphragm with said burst diaphragm penetrator;
    effecting a temporary compressed gas flow restriction at the penetrated burst diaphragm; and
    subsequently removing said temporary compressed gas flow restriction from said penetrated burst diaphragm.

* * * * *